(12) United States Patent
Fessler

(10) Patent No.: US 7,270,843 B2
(45) Date of Patent: Sep. 18, 2007

(54) METHOD AND DEVICE FOR COATING A PRODUCT

(75) Inventor: Martin Fessler, Vejen (DK)

(73) Assignee: Gram Equipment A/S, Vojens (DK)

( * ) Notice: Subject to any disclaimer, the term of this patent is extended or adjusted under 35 U.S.C. 154(b) by 669 days.

(21) Appl. No.: 10/481,271

(22) PCT Filed: Jun. 19, 2002

(86) PCT No.: PCT/DK02/00410

§ 371 (c)(1),
(2), (4) Date: Jan. 6, 2004

(87) PCT Pub. No.: WO03/000064

PCT Pub. Date: Jan. 3, 2003

(65) Prior Publication Data

US 2004/0231589 A1 Nov. 25, 2004

(30) Foreign Application Priority Data

Jun. 21, 2001 (DK) .............................. 2001 00975

(51) Int. Cl.
*A23P 1/08* (2006.01)
*A23G 3/20* (2006.01)
(52) U.S. Cl. .................. 426/306; 426/302; 118/13; 118/16
(58) Field of Classification Search .............. None
See application file for complete search history.

(56) References Cited

U.S. PATENT DOCUMENTS

| | | | | |
|---|---|---|---|---|
| 1,136,074 A | * | 4/1915 | White | 426/279 |
| 1,495,251 A | * | 5/1924 | Davis | 118/13 |
| 1,499,149 A | | 6/1924 | Buhse et al. | |
| 1,784,992 A | | 12/1930 | Lange | |
| 2,176,409 A | * | 10/1939 | Peterson | 426/279 |
| 2,282,661 A | * | 5/1942 | Lewis | 118/502 |
| 2,334,654 A | * | 11/1943 | Sportolari | 426/306 |
| 2,642,029 A | * | 6/1953 | Campbell | 118/30 |
| 3,171,367 A | * | 3/1965 | Carter et al. | 426/282 |
| 3,640,243 A | * | 2/1972 | Dill et al. | 118/24 |
| 4,188,768 A | | 2/1980 | Getman | |

(Continued)

FOREIGN PATENT DOCUMENTS

DK 173587 2/2001

(Continued)

*Primary Examiner*—Carolyn Paden
(74) *Attorney, Agent, or Firm*—James Creighton Wray; Clifford D. Hyra

(57) ABSTRACT

A device and a method used when coating a wafer is described. The fluid coating is provided by an inside coating as well as an edge coating. The fluid chocolate in a container is stirred by displacing a vat up and down. During this displacement, the vat will be brought in contact with the wafer, so the chocolate substance, which is provided in there, provides an edge coating. Displacement of the first vat provides a repression of the chocolate substance, which through a nozzle is injected into the wafer in order to provide an inside coating. By repression, a pumping occurs, which is interrupted substantially simultaneously with the edge of the wafer getting in contact with the surface of the chocolate in vat, when it is elevated up towards the wafer, which is suspended in a commonly known apron conveyor (not shown).

14 Claims, 6 Drawing Sheets

U.S. PATENT DOCUMENTS

| | | | | |
|---|---|---|---|---|
| 4,289,791 A | * | 9/1981 | Weinstein | 426/139 |
| 4,313,965 A | * | 2/1982 | Weinstein | 426/139 |
| 4,390,553 A | * | 6/1983 | Rubenstein et al. | 426/138 |
| 4,454,834 A | * | 6/1984 | Haas et al. | 118/676 |
| 4,505,220 A | * | 3/1985 | Bank et al. | 118/16 |
| 5,007,466 A | * | 4/1991 | Mueller et al. | 141/1 |
| 5,064,666 A | * | 11/1991 | Vos | 426/94 |
| 5,102,672 A | * | 4/1992 | Vos | 426/94 |
| 5,127,449 A | * | 7/1992 | Mueller et al. | 141/1 |
| 5,419,099 A | * | 5/1995 | Mueller et al. | 53/473 |
| 5,524,683 A | * | 6/1996 | Mueller | 141/129 |
| 5,865,895 A | * | 2/1999 | Huffman et al. | 118/681 |

FOREIGN PATENT DOCUMENTS

| | | |
|---|---|---|
| EP | 0045522 | 2/1982 |
| EP | 0350352 | 1/1990 |
| IT | 1264157 | 9/1996 |
| JP | 9103249 | 4/1997 |

* cited by examiner

METHOD AND DEVICE FOR COATING A PRODUCT

This application claims the benefit of Danish Application No. PA 2001 00975 filed Jun. 21, 2001 and PCT/DK02/00410 filed Jun. 19, 2002.

BACKGROUND OF THE INVENTION

The present invention relates to a method for coating a wafer with a fluid coating from a coating container, wherein the product is given an edge coating as well as a coating on the inside surfaces, where said coating is stirred, as the repression bodies are elevated and lowered in one or more first areas of said coating container.

Furthermore, the invention relates to a device for coating a wafer with a fluid coating from a coating container, wherein the product is given an edge coating as well as a coating on the inside surfaces, which device comprises repression bodies that are intended for stirring the coating, and which are provided in the container as well as supply bodies for the coating, where the device comprises at least one first area of the coating container, where repression bodies are provided that are arranged for displacement down into and up from the mixture, a second area of the coating container where a well-defined surface level can be established by means of level plates that limit the second area in which the products are immersed, and at least a third area in which the supply bodies end.

The invention is especially applicable for an inside coating as well as an edge coating of confectionary products such as ice-cream wafers with a fluid chocolate coating which may comprise chocolate bean shells. However, the invention will also be applicable in other areas where coating is established by spraying the coating onto the inside of the product as well as edge coating by immersing the product into a coating mixture, in which a stirring is carried out in order to avoid sedimentation of the different ingredients in the coating. Thus, present invention will be advantageous in connection with coating, which comprises different fluid basic ingredients that tend to sediment, if no stirring is performed.

In wafers, coating is performed out of consideration of the product's durability and in order to avoid that ice-cream comes into direct contact with the wafer and softens it.

Thus, there is a need to create a damp-proof coating on the inside as well as on the edge.

Previously, when establishing a chocolate coating of wafers, spray-nozzles connected with a pump were used for spraying coating into the inside of the wafer and containers were used in which the wafers are immersed in rows, as they hang freely at the under side of a traditional apron conveyor. In the container, different types of repression bodies have been applied in order to create a stirring in the shape of a circulation in the fluid chocolate substance. This has often been combined with a rotating mechanical stirrer, arranged at the bottom of the container in order to create sufficient movement in the coating mixture.

However, the known methods to create movement in the coating mixture have caused a problem, as the repression bodies and the stirring bodies have been exposed to wear due to cocoa bean shells. This has had a damaging influence on the reliability. Furthermore, the known spray-nozzles are very sensitive towards the coating's viscosity and temperature. There is a large risk of clogging or operation failure. Large demands for very well-defined characteristics for coating are put forward in order to establish a correct spray/mist for correct coating. This has the effect that only a very expensive special chocolate coating has been applicable, even though it has not been necessary with respect to the quality of the product.

In known coating containers used when coating ice-cream wafers, a problem has existed if a wafer has been disconnected from a conveyor and fallen down into the coating mixture. Such a situation will cause problems, as a spray of chocolate is pumped out into the room and soils the device and the surroundings. Furthermore, the wafer fragments will be mixed in with the substance. This can clog up the nozzles and may damage the repression pumps that are used in order to create circulation in the coating mixture. For many years, tests with the establishment of filters have been going on. However, this has been difficult in coating mixtures comprising additives; as such additives must be conveyed through the system without problems.

In the Danish patent DK 173 587, is described a method and device of the previously mentioned type for coating a product, where it is possible to coat confectionary products such as ice-creams by immersion.

SUMMARY OF THE INVENTION

The object of present invention is to provide a method and a device, which makes it possible to remedy disadvantages in the known systems by permitting an effective simultaneous inside coating and edge coating with a technically simple device, where there is no risk of pumps and spray-nozzles clogging up and/or being destroyed, and where it is possible to use a coating with fewer demands for the filtration simultaneously.

According to present invention, this is obtained with a method of the type mentioned in the beginning, which is characterized in that the wafers in a second area of the coating container are supplied with said edge coating, that fluid coating is sprayed from the bottom and upwards into the wafers, just before the edge coating is carried out, as the coating of the repression bodies is pumped diagonally into the wafers through nozzles for constructing the inside coating, that the pumping is interrupted almost simultaneously with the edge of the wafer contacting the surface, and that the level of the coating's surface in the coating container's second area is either kept stationary or the wafers are kept stationary when the product is being edge coating.

According to present invention, the device is characterized in that the device also comprises nozzles which are provided in the second area, in a position for each of the wafers, and which is connected with the repression bodies in the first area, and which are arranged to inject fluid coating into the inside of the wafer under an angle in relation to a central axis for the wafer, and valves that are connected with the repression bodies in the first area in order to interrupt/permit the injection.

A system, according to present invention, is thus a system without pumps, which permits a very unproblematic and careful handling of the coating. Surprisingly, it has proved to be possible to establish sufficiently stirring to avoid sedimentation/precipitation by elevating and lowering the repression bodies in the coating in the immersion container. By immersion of the bodies, the coating is displaced between the first and second areas of the container. The variable flow combined with the disturbance which is established in the container has proved to be sufficient in order to avoid sedimentation and sufficient to maintain a homogeneous mixture, even when using relatively small amounts of coating mixture in the immersion container. When moving the repression bodies it is possible to establish a pumping of coating via the nozzles into the inside of the wafer at the same time. This can, by using an appropriate control system, occur in coordination with the edge coating, as nozzles are provided in the area of the container where the edge coating is performed.

It has proven to be possible to provide supply bodies that convey fluid coating directly into the container. When it is secured that these end in an area, which is not in direct contact with the second area, where the products are immersed, it will be possible to establish sufficient mixture to create a homogenous coating. This is made possible when the supply bodies end in a third area. Before the coating reaches the second area, where it is used to coat the wafers, the coating will perform homogeneously because of the repression bodies' movement.

The device is very simple to construct, as the need for repression pumps, stirring bodies and axis lead-ins between motors outside the container and mechanical stirring bodies inside the container is avoided. The movement of the repression bodies can be established very simply by connecting these with driving bodies that stretch through the container's upper part.

An advantageous embodiment of the method is distinct in that the wafers are edge-coated at a time when the repression bodies are completely lowered, and when the level for the coating mixture's surface is kept stationary at an upper level. In this way it is secured that the products are given an edge coating at a homogeneous height. This level is obtained in an especially precise and simple way by using level plates in the device. The level plates may be adjusted at the preferred height.

It is preferred that the repression bodies are internal vats and that side walls in such internal vats are used as level plates, so that inside the internal vat area, a well-defined level for coating is provided.

Even though the level in the container is adjusted when using the level plates, it is necessary to refill the container. With reference to this, according to the invention, the method is distinct in that the consumption of the coating is determined, that as a result of this decision, refilling of the coating at an adjusted scale, as fluid coating is introduced into a third area of the coating mixture. As mentioned earlier, it is essential that the supply bodies end in the third area in order to obtain a sufficient mixture.

The supply bodies are mainly controlled by a control unit, which receives a signal from registration bodies that measure the coating level in the container. Thus, it will be possible to continuously add the amount of coating that is necessary in order to keep the amount of coating within predetermined limits. These limits will ensure that the coating will always reach the upper side of the level plates when the repression bodies are completely lowered into the mixture.

According to an advantageous embodiment, the device is distinct in that the container comprises lengthy first and second internal vats. When the container is constructed in this way, it will be suitable for it to be placed below a conveyor, where more products, for example ice-cream cones are suspended at the underside of a rod-chain conveyor. Thus, a large number of ice-cream cones in alignment can be coated at the same time in the lengthy vat. As the third area is provided at one side of the lengthy area, an especially simple arrangement of the supply bodies is obtained outside the rod-chain conveyor, which is arranged above the container.

BRIEF DESCRIPTION OF THE DRAWINGS

Description of the Drawings

Figure 1:
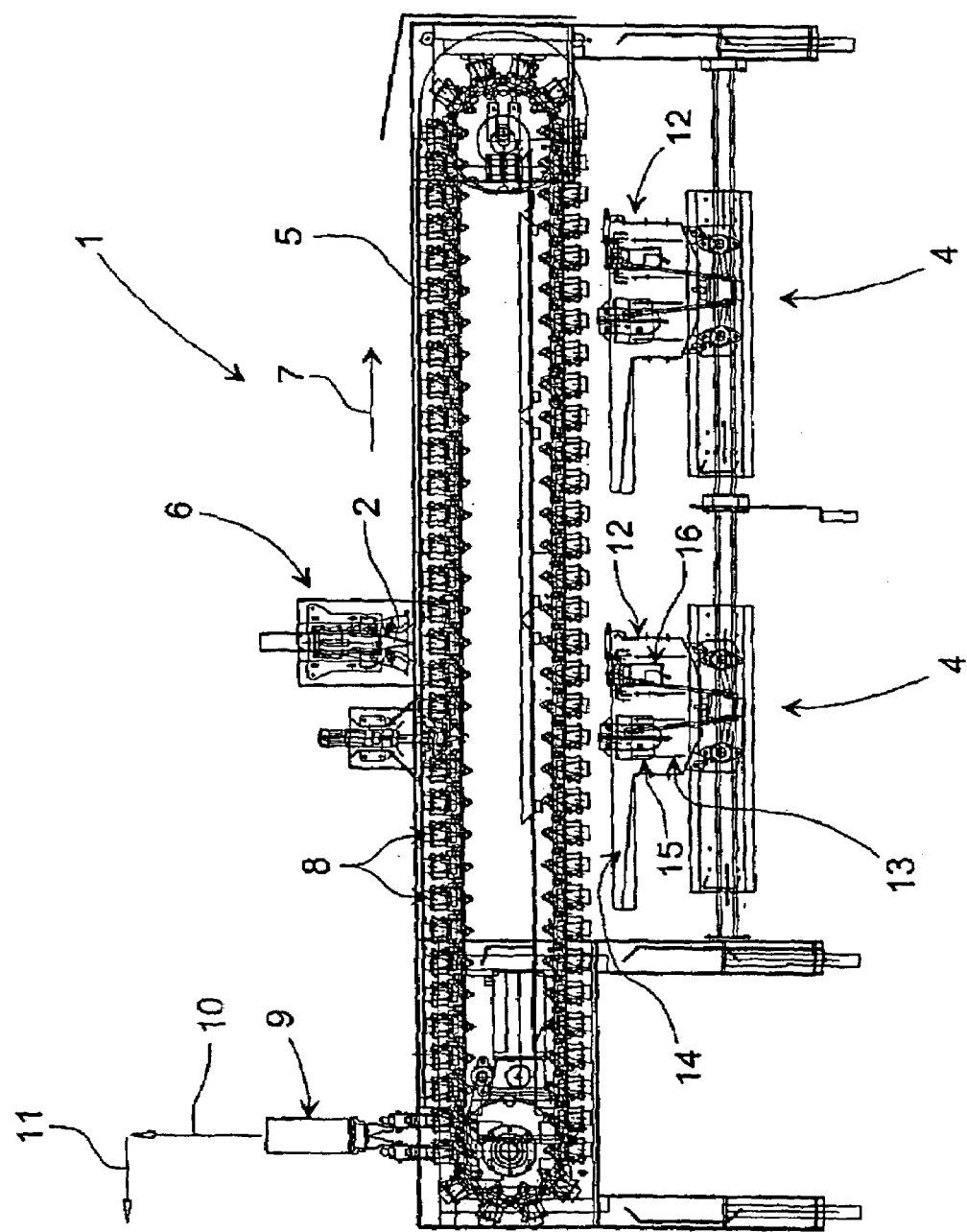
Figure 2:
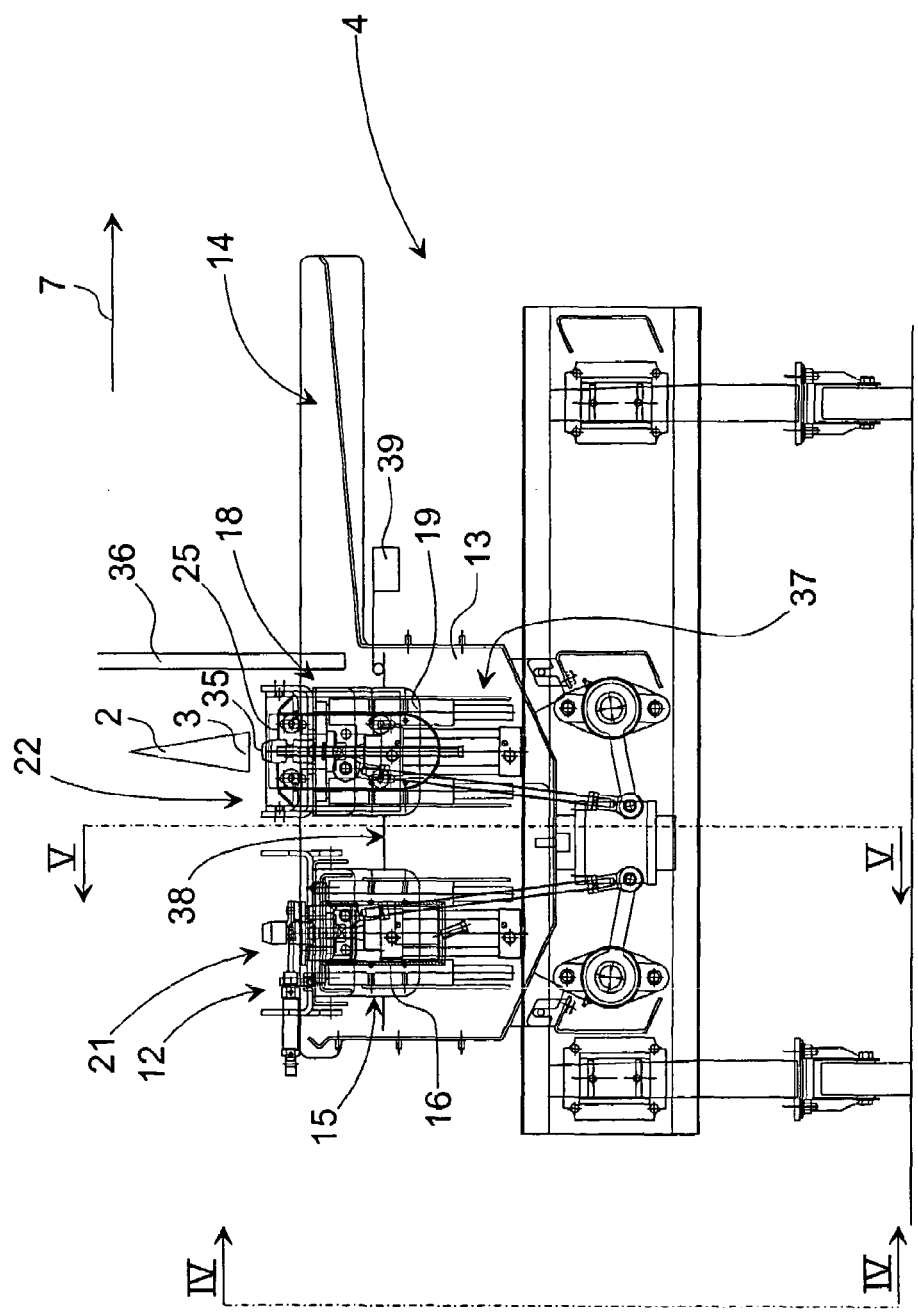
Figure 3:
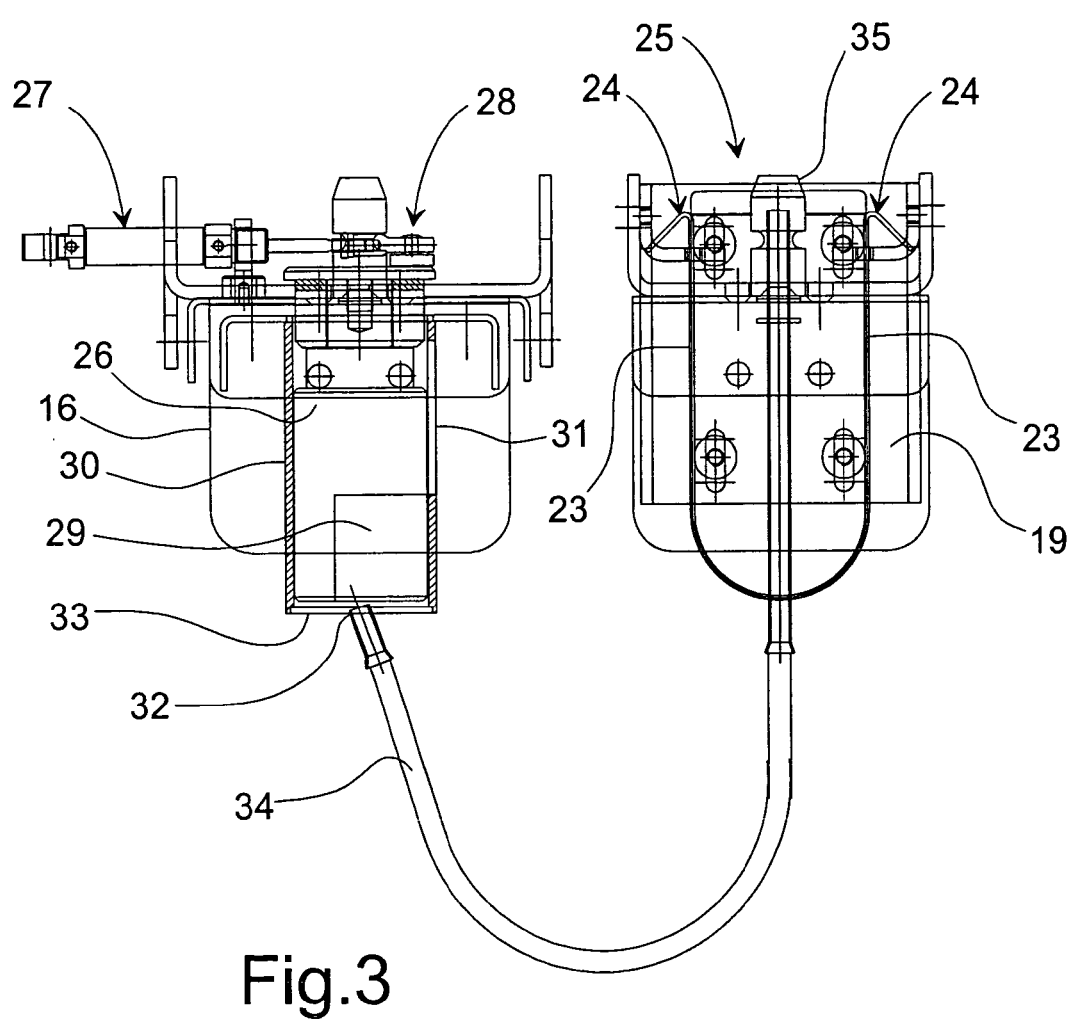
Figure 4:
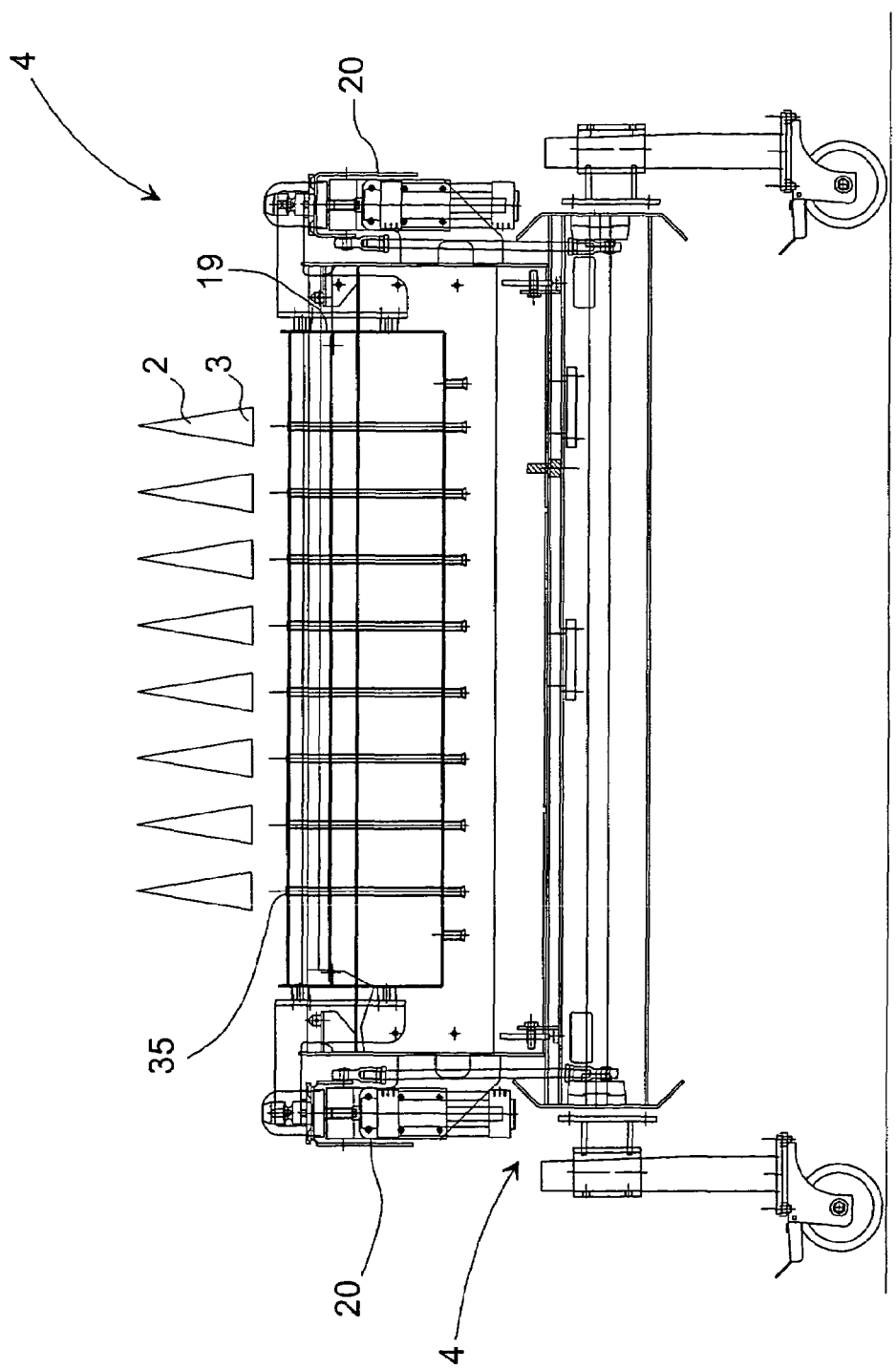
Figure 5:
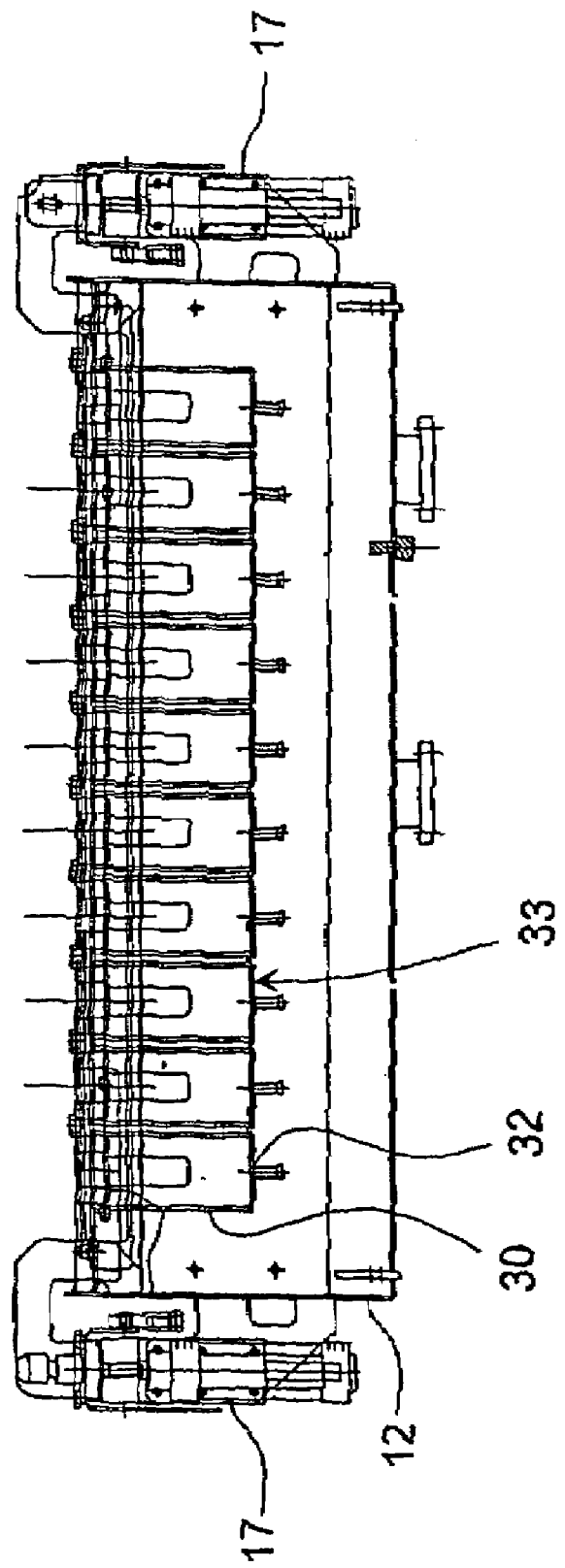
Figure 6:
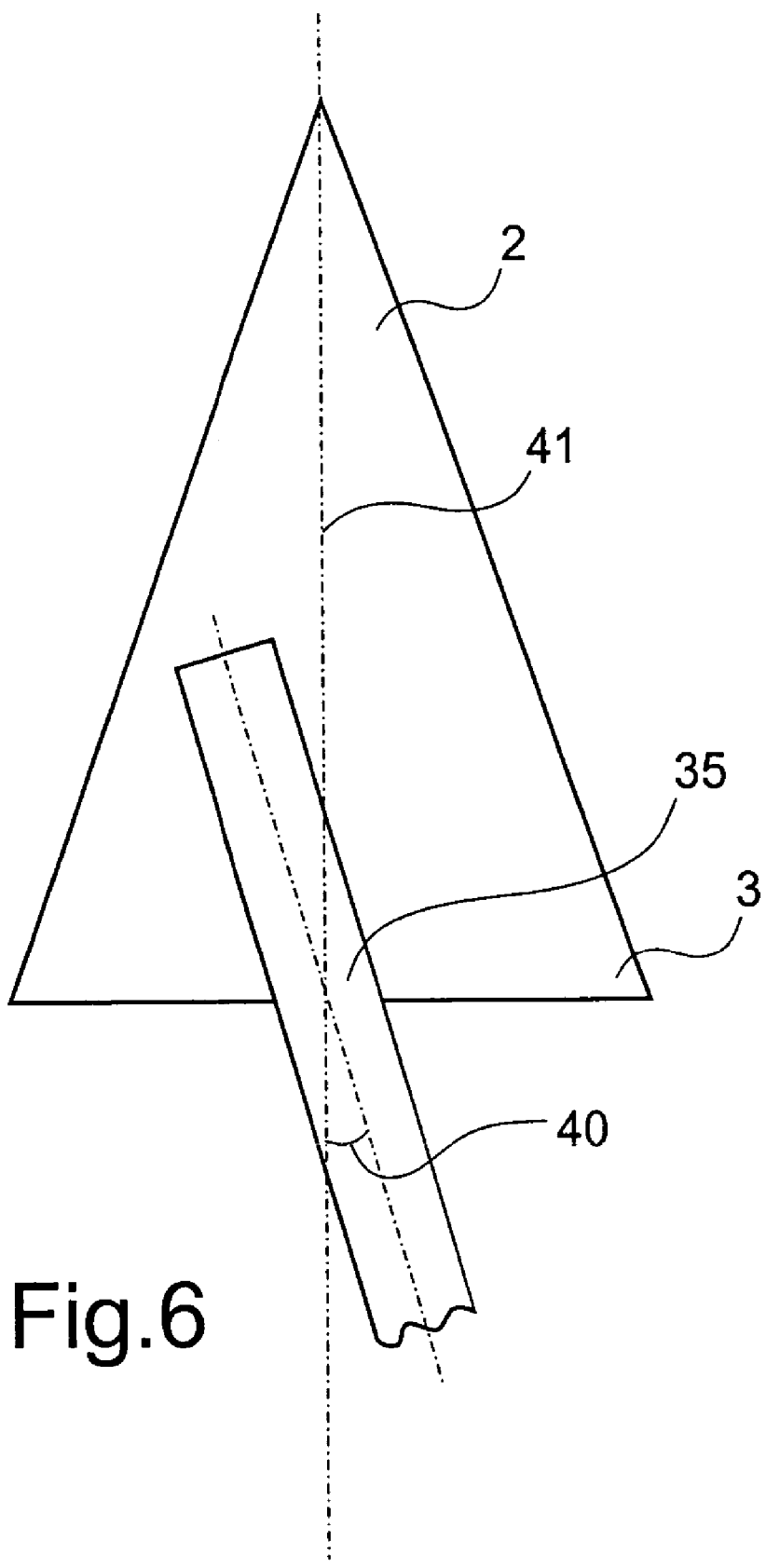

Hereafter, the invention will be explained in detail, referring to the drawing enclosed where FIG. 1 shows an installation which comprises a device according to the invention, FIG. 2 shows an enlarged picture of a part of the installation shown in FIG. 1 for illustrating a device according to the invention, FIG. 3 shows an enlarged side view of part of the device shown in FIG. 2, FIG. 4 shows a side view, partly cut through, taken according to the arrows IV-IV in FIG. 2, FIG. 5 shows a picture seen according to the arrows V-V in FIG. 2, and FIG. 6 shows a picture of the mutual position for wafer/nozzle.

DETAILED DESCRIPTION OF THE PREFERRED EMBODIMENTS

In the drawing's figure, identical or corresponding units will be marked with the same reference number. Therefore, there is not given a specific explanation to each unit in connection with each figure.

In the drawing, an installation 1 is illustrated for use when coating truncated cone shaped wafers 2 (see FIG. 2), as these are provided with a coating on their inside as well as a coating on the edge-area 3.

The installation 1 comprises a device 4 according to the invention. The installation 1 comprises a rodchain conveyor, where a row of ice-cream, cones are arranged in a mounting station 6 and lead in direction of conveyor 5, which is indicated by an arrow 7, as they are maintained in the rod-chain conveyor in a row substantially perpendicular to the installation illustrated the rod-chain conveyor can in each row 8, comprise between one and twenty waters, preferably between four and twelve wafers. After passage past device 4 or two succeeding devices 4 shown in FIG. 1, the waters will be lead into a disassembly station 9, where they are removed, as illustrated by the arrows 10 and 11. This can for example happen when using robots.

The device 4 according to the invention, is illustrated more distinctly in FIG. 2. The device comprises container 12, in which a coating 13 is provided in the form of fluid chocolate substance. The container 12 has in direction 7 of conveyor 5 a drip tray for dripping off 14, where extra chocolate drips down and runs back into the container 12.

The container 12 comprises a first repression body 15 in the shape of an internal lengthy first vat 16 (also see FIG. 5). The vat at each end is connected with piston arrangements 17, which permits the vat 16 displacement in and out in the fluid chocolate 13. The container comprises other repression bodies 18 in the shape of a second internal lengthy vat 19 (also see FIG. 4). The lengthy vat 19 is also connected with piston arrangements 20 at each end, which permits a displacement of the vat in and out in the fluid chocolate substance 13.

The first vat 16 is provided in the first area 21 of the container 12 and the second vat 19 is provided in a second area 22 of the container 12. The second vat has side walls 23, which upper edge 24 comprises an upper level for a surface 25 of the coating, in which the wafer 2 is edge-coated. The coating is performed by the wafers being maintained in a stationary position and by a sliding directed upwards from the vat 19, so a preferred distance of the edge 3 is covered with chocolate.

The first vat 16 comprises a piston 26 which rotates when using a pneumatic cylinder piston device 27 that is connected with the piston at an asymmetrical position 28 on the piston's 26 upper side. By activating the cylinder piston device 27, the piston 26 can be rotated in one or another direction. At one of its sides, the piston 26 has a recess 29, which runs in the piston's axial extension body and extends over a part, preferable 60° of the piston's circumference. The piston is displaced in a cylinder lining 30 which is constantly connected with the vat 16. The cylinder lining 30 has on its side an opening 31 more or less opposite the opening of the recess 29 and a connection between the inside of the piston and the other part of the vat 16. By rotating the piston 26 the recess 29 can be in alignment with the opening 31 or displaced away from that position. By arranging the recess 29 in that way aligned with the opening 31, the chocolate substance will be pumped back and forth and establish stirring in the vat. When the recess 29 and the opening 31 are not in alignment, fluid chocolate will be pressed through an opening 32 in the cylinder's end wall 33. The chocolate is pressed further through a pipe 34, which is connected with a nozzle 35 that is arranged below each wafer 2.

The nozzle 35 will be oriented under a diagonal angle 40 (see FIG. 6) in relation to a central axis 41 through the vertically oriented cone-shaped wafers that are arranged with the opening facing downwards. Hereby, fluid chocolate substance will be sprayed onto the inside of the wafer with great power and create a circulating movement, which ensures a complete and homogeneous surface coating of the entire inside surface in the wafer 2. This injection is performed simultaneously with the elevation of the vat 19 and just before the vat is lifted to a position, where the surface 25 is brought in contact with the edge 3 of the wafer. In this position the supply is interrupted by rotating the piston 26. Hereby, the inside of the wafer will more or less be filled with fluid chocolate, when they are immersed in the fluid chocolate in the second vat 19.

In order to refill the container 12 with chocolate, which is used for coating, supply bodies that comprise a pipe 36 which ends in a third area 37 of the container 12, are provided. The pipe 36 is connected with a central installation in the company where the installation 1 is arranged. The supply of fluid chocolate can occur by registering the level 38 of the chocolate substance 13 in the container 12. This can happen by using a level sensor 39, which is connected with a central control unit that is connected with the supply bodies and can regulate valve and engine etc. (not shown) for the supply of fluid chocolate substance to the container 12.

As mentioned above, it is essential that stirring is done when using the sliding vats 15, 19 so sedimentation of the chocolate substance does not occur. By pumping the chocolate substance, the mutual displacement between the piston 26 and the cylinder 30, that is lead up and down, will dislodge a large amount of fluid chocolate, which is pumped out through the nozzle 35 in that way there is no need to provide a mist-spray, as used in known coating systems, and the system is therefore not especially sensitive towards a possible content of cocoa bean shells in the fluid chocolate.

In the text above, the invention is explained with reference to specific methods as well as a specific application. However, it will be apparent that the device can be embodied in different ways than shown in the figures, just as the method will be applicable in connection with other products than ice-cream cones.

The invention claimed is:

1. Method for coating a wafer with a fluid coating from a coating container, wherein the wafer is given an edge coating as well as a coating on its inside surfaces, where said fluid coating is stirred, as repression bodies are elevated and lowered in one or more first areas of said coating container, wherein said wafers in a second area of said coating container are supplied with said edge coating, that said fluid coating is sprayed from below upwards in said wafers, just before said edge coating is carried out, wherein said fluid coating from said repression bodies is pumped diagonally up into said wafers via nozzles for constructing an inside coating on the inside surfaces, wherein the pumping is interrupted almost simultaneously with the edge of the wafer contacting a surface of the fluid coating, and that either a level of the said coating's surface in said coating container's second area is kept stationary or the wafers are kept stationary when the product is being edge-coated.

2. Method according to claim 1, wherein said edge coating is established by said coating container containing repression bodies in the shape of a first internal vat, which is elevated at a time when the level of the fluid coating's surface in the first internal vat is kept stationary at an upper level.

3. Method according to claim 2, wherein the stationary level is defined by level plates that encircle the first internal vat.

4. Method according to claim 1 wherein consumption of said fluid coating is determined, and that as a result of this determination, refilling the fluid coating at an adjusted scale is performed, as said coating is introduced into a third area of said coating container.

5. Method according to claim 1, wherein said fluid coating is sprayed into the wafers by pumping, as said coating container comprises repression bodies in the shape of a second internal vat in which cylinders are provided that work together with stationary pistons for establishing the injection under said second internal vat's displacement in said coating container.

6. Method according to claim 1, wherein the products are comprised of ice-cream wafers that are preferably cone-shaped, and that said fluid coating is comprised of a fluid chocolate substance.

7. Device for coating wafers with a fluid coating from a coating container as the wafers are given an edge coating as well as a coating on inside surfaces of the wafers, which device comprises repression bodies that are intended for stirring said coating and which is provided in said coating container as well as supply bodies for said coating, where said device comprises at least a first area of the coating container, where repression bodies are provided that are arranged for displacement down into and up from the mixture, a second area of said coating container, where a well defined level for the surface can be established by means of level plates that limit said second area and in which the products are immersed, and at least a third area in which said supply bodies end, wherein the device furthermore comprises nozzles, which are provided in said second area, in a position for each of the wafers, and which is connected with said repression bodies in said first area, and which are arranged in order to inject fluid coating into said wafer's interior below an angle in relation to a central axis for said wafer, and valves that are attached to said repression bodies in said first area in order to interrupt/permit the injection.

8. Device according to claim 7, wherein said container comprises repression bodies in the shape of a lengthy first vat, which is provided sliding up and down in said first area next to said second area, further repression bodies are provided in said other area in the shape of a lengthy second internal vat, which is provided sliding up and down, and which comprises level plates that define a surface for said coating in said second area.

9. Device according to claim 8, wherein said first vat comprises cylinders in which side walls, an opening is provided that is connected with said container, and in which pistons with a recess are mounted, and which can, be turned between a stirring position where the recess is in alignment with the opening, and an active pumping position where the recess is continued in relation to the opening in the side wall, whereby fluid coating in said cylinder can be pushed through a hole in said cylinder's end wall, which hole is connected with said nozzle for the injection of coating into said wafer.

10. Device according to claim 7 wherein bodies for registering the level of coating in the container is provided, and that these are connected with the supply organs via a control system.

11. Method for coating an edge and inside surfaces of wafers comprising providing a fluid coating mixture in a coating container as the wafers are given an edge coating as well as a coating on the inside surfaces, further comprising moving repression bodies up and down and stirring said coating which is provided in said coating container, as well as providing supply bodies for said coating, providing in said container comprising at least a first area of the coating container, where the repression bodies displace down into and up from the fluid coating, providing a second area of said coating container for immersing the wafers, providing level plates in the second area, establishing a well-defined level for the surface by means of level plates that limit the fluid coating level in said second area in which the products are immersed, and providing at least a third area in which said supply bodies end, further comprising providing nozzles in the said second area, in position for each of the wafers, connecting the nozzles with said repression bodies in said first area, arranging the nozzles for injecting the fluid coating into interiors of said wafer products at an angle in relation to a central axis of said wafers, and providing valves attached to said repression bodies in said first area for interrupting/permitting the injecting of the fluid coating through the nozzles.

12. Method according to claim 11, wherein the providing the repression bodies comprises providing the repression bodies in the shape of a sliding up and down lengthy first vat in said first area next to said second area, and providing the bodies in said second area in the shape of a sliding up and down lengthy second internal vat for moving up and down the level plates that define a surface for said fluid coating in said second area.

13. Method according to claim 12, wherein providing said first vat comprises providing cylinders having side walls, providing in the side walls an opening connected with said container, mounting pistons with recesses in the side wall, and turning the pistons between a stirring position where the recesses are in alignment with the opening, and turning the pistons to active pumping positions where the recesses are continued in relation to the opening in the side wall, and pushing fluid coating in said cylinder through holes in said cylinder end walls, and connecting the said nozzles for injecting the fluid coating into said waters.

14. Method according to claim 11 further comprising providing sensors for registering the level of the fluid coating in the container and connecting with the supply bodies via a control system connected to the level sensors.

* * * * *